United States Patent [19]
Pagella et al.

[11] 3,818,580
[45] June 25, 1974

[54] MACHINE TOOL WITH AUTOMATIC TOOL-CHANGE

[75] Inventors: Elio Pagella; Giorgio Ollearo, both of Ivrea, Italy

[73] Assignee: Ing. C. Olivetti & Co., S.p.A., Ivrea (Turin), Italy

[22] Filed: July 30, 1971

[21] Appl. No.: 167,771

[30] Foreign Application Priority Data
Aug. 28, 1970 Italy.................................. 69910/70

[52] U.S. Cl. ................................................ 29/568
[51] Int. Cl............................................ B23q 3/157
[58] Field of Search........................... 29/568, 26 A

[56] References Cited
UNITED STATES PATENTS

| | | | |
|---|---|---|---|
| 3,242,568 | 3/1966 | Flannery et al. | 29/568 |
| 3,271,853 | 9/1966 | Pfister | 29/568 |
| 3,286,344 | 11/1966 | Brainard et al. | 29/568 |
| 3,354,761 | 11/1967 | Sadier | 29/568 X |
| 3,414,967 | 12/1968 | Erikson | 29/568 |
| 3,545,075 | 12/1970 | Ollearo | 29/568 |
| 3,551,974 | 1/1971 | Fantoni | 29/26 A |

*Primary Examiner*—Andrew R. Juhasz
*Assistant Examiner*—Z. R. Bilinsky
*Attorney, Agent, or Firm*—Schuyler, Birch, Swindler, McKie & Beckett

[57] ABSTRACT

A machining centre has a tool-storage magazine in the form of an endless track along which a series of carriages is slidable. Each carriage releasably carries a tool holder. A portion of the track at a tool-change station is movable, and forms part of a tool-change arm that is movable between a position in which the movable portion completes the track, and another position in which the carriage in the movable portion is located at the spindle. Means is provided for releasing the tool holder from the carriage when it reaches the spindle. The carriages are driven along the track by contact with each other, the train of carriages being driven by a toothed wheel engaging rollers on the carriages. Another portion of the track is movable on a guide to a tool substitution station located at a place conveniently accessible to an operator.

28 Claims, 14 Drawing Figures

MACHINE TOOL WITH AUTOMATIC TOOL-CHANGE

This invention refers to so-called machining centres, which are large machine tools generally controlled by a computor to perform a series of machining operations on a workpiece using different tools in sequence. The tools are stored in a magazine that forms part of the machine and are individually drawn from it by automatic means and inserted in a spindle, being returned to the magazine after use and replaced by the next tool required.

It is known to use a rotating drum as the storage magazine, the tools being brought when required for use to a fixed tool-change station by rotation of the drum. At the tool-change station the tool is connected to the spindle while the drum remains stationary in the position it has then reached.

This system suffers from the disadvantage that only a limited number of tools can be stored in the magazine. Each increase in the number of tools increases the size of the drum, which becomes costly and moveover difficult to move satisfactorily beyond a certain size.

In a known machine, the tool-change is carried out by a tool-change arm which has both a rectilinear and a rotational movement and has two parts, one of which grips the tool in the spindle and moves it back to the magazine while the other grips the next tool required in the machining operation and moves it from the magazine to the spindle. The magazine of this machine has the same disadvantage as that described above. Moreover, this machine suffers from the disadvantage that the movements of the drum and arm set a limit on the length of the tools that can be carried and on the distance between them, and therefore on the number of tools.

In an attempt to increase the number of tools that can be carried in magazine, it has been proposed to provide a magazine in the form of a chain mounted for movement in a path which lies in two or more planes. Each link has a tool holder attached to it, releasably carrying a tool. However, even with this structure the problem of increasing the capacity of the magazine is not fully solved since the links cannot be very short lest the tools interfere with each other in the curved zones of the chain path.

All the machine described above also have the drawback that the magazine is not readily accessible to operators for replacement of the tools from time to time, as for instance when the drum has a vertical axis and is located at the cap of the machine at the top of the column. Moreover, such substitution can be carried out only when the machine is stopped.

The object of the invention is to provide a machining centre in which the above-mentioned difficulties are mitigated or overcome.

The invention provides in a machine tool with automatic tool-change, the machine tool comprising a spindle, a tool storage magazine, and a tool-change member adapted to move a tool between the magazine and the spindle, the improvement that the magazine comprises an endless track, with a series of carriages slidable along the track, each carriage being adapted to carry releasably a tool, and including means to drive the carriage along the track.

Another aspect of the invention provides the machine tool, in which the tool-change member is connected to a movable portion of the track that is adapted to support a carriage and is adapted to be moved by the arm between a first position in which that movable portion completes the track and a second position in which that movable portion is located at the spindle.

The invention will be understood from the following description in which reference is made to the accompanying drawings, in which.

CONSTRUCTION OF THE MACHINE

Figure 1:
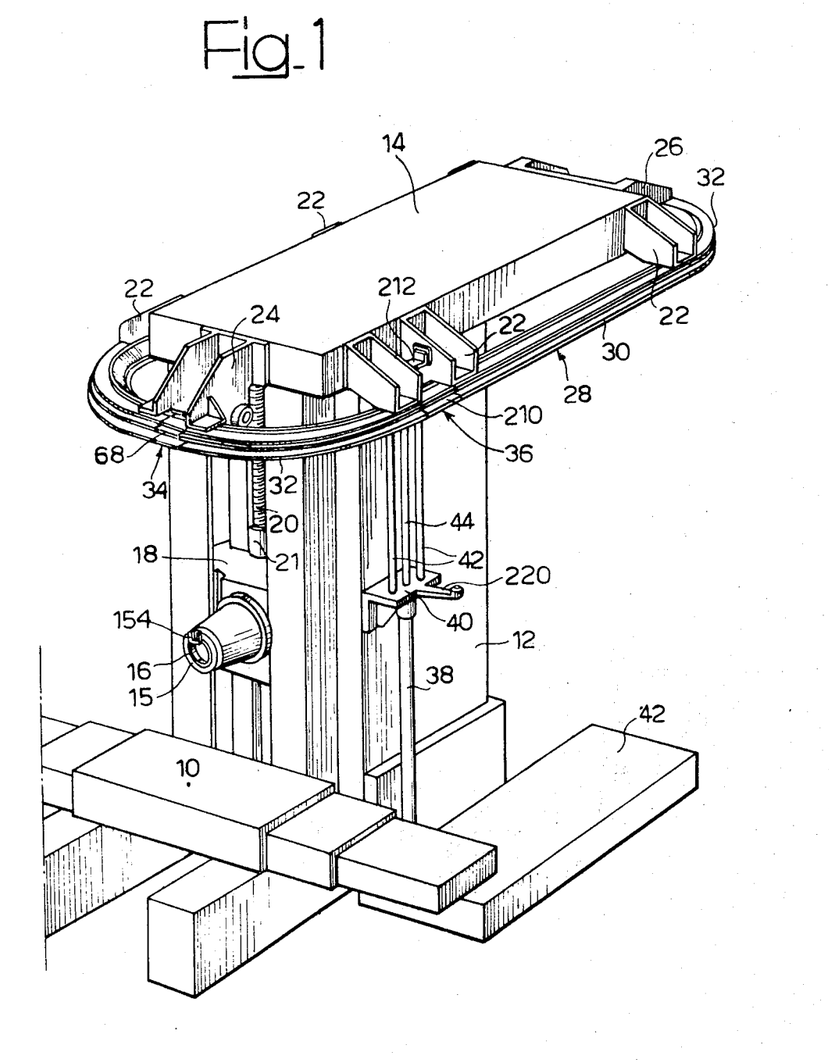
FIG. 1 is a perspective view of a machine tool for a machining centre according to the invention, certain components being omitted.

FIG. 1 shows a machine tool for a machining centre having a conventional table 10 for supporting a workpiece, a column 12 with a rectangular cap structure 14, and a spindle 16. The table 10 is movable under numerical control along two perpendicular co-ordinates while the spindle 16 is rotatable in a fixed bush 15 mounted on a saddle 18 that is movable vertically on a screw 20 and a lead screw 21 between an upper tool-change position and a lower working position, also determined by numerical control. The spindle is driven by conventional means, not illustrated. The machine is provided with a device (not illustrated) for angular alignment of the spindle 16, substantially of the type described in Italian Patent No. 808,399. This alignment device is actuated at the end of each working cycle to bring the spindle into a predetermined angular position in which it can receive a correspondingly oriented tool.

The cap 14 has several outwardly projecting support brackets 22 (FIG. 1) secured to its sides, and another support bracket 24 at its front end above the spindle 16. At its rear end is a further bracket 26, seen only partially in FIG. 1. Gripped by the brackets 22, 24 and 26 and extending around the cap 14 is an endless track 28 lying in a horizontal plane. In practice the track 28 carries a series of carriages 100 not illustrated in FIG. 1, one of which is seen in detail in FIG. 5. The track 28 forms with the carriages a storage magazine for the tools. The track is composed of rectilinear portions 30 running parallel to the sides and ends of the cap, and radiused portions 32 joining the rectilinear portions. At the bracket 24 a portion 68 of the track is movable in a manner to be described later to carry out the tool change.

Another movable portion 210 of the track 28 is incorporated in a tool substitution device 36 located between two of the brackets 22 and including a fixed pillar 38, a fixed base plate 40, two fixed guide rods 42, and a telescoping rod 44 extending into the pillar 38. A platform 42 is provided under the substitution device, which will be described fully later.

Each bracket 22, 24 comprises a plate for connection to the cap 14 and two limbs perpendicular to the plate and to which is connected the track 28.

Figure 2:
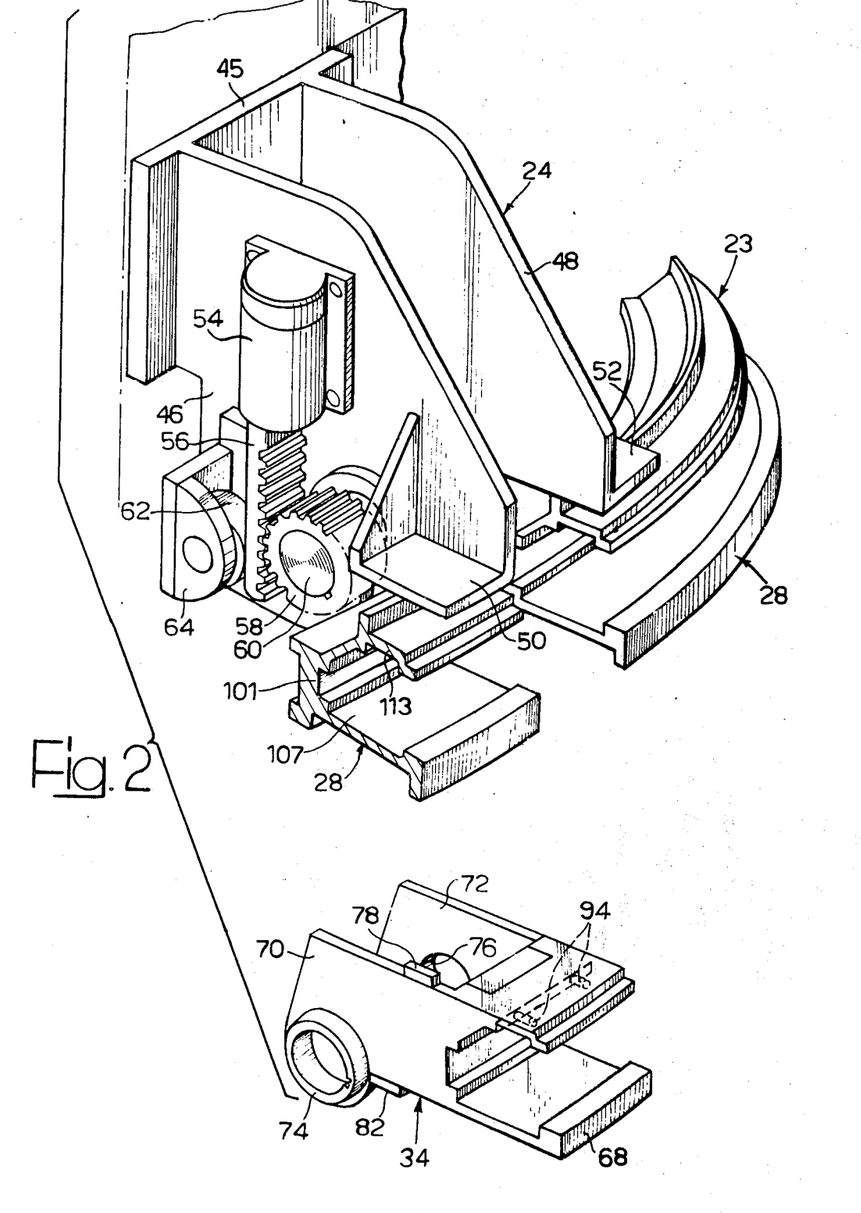
FIG. 2 is a perspective exploded view of a supporting bracket and tool-change arm of the machine of FIG. 1, on an enlarged scale.

As best seen in FIG. 2, the bracket 24 comprises a plate 45 by which it is attached to the cap 14, and two limbs 46, 48. The space between the limbs 46, 48 defines a tool-change station. The limb 46 has a flange 50 attached to the track 28, and the limb 48 has a similar flange 52. Also mounted on the limb 46 is a double-acting hydraulic cylinder 54 which has a rack 56 attached to the stem of its piston. The rack 56 meshes with a pinion 58 that is toothed over only a portion slightly exceeding 90° of its circumference, and is solidly connected to a shaft 60 (FIGS. 3 and 4) that extends between the two bracket limbs and is set in bearings (not seen) in them.

The back of the rack 56 is flat and is supported by a roller 62 mounted in a bracket 64 that is rigidly attached to the limb 46. The roller 62 resists bending forces on the rack 56 and thus keeps its movement accurate.

The hydraulic cylinder 54 is supplied with liquid by means not illustrated, and includes means known in the art, also not illustrated, to dampen the movement of the piston 66 (FIG. 3) at the top and bottom of its strokes.

The portion 68 of the track 28 (FIG. 2) is carried by a tool-change member in the form of an arm 34 which at its rear end is divided into the limbs 70, 72 through which the shaft 60 passes. A perforated boss 74 is provided on the limb 70 and a perforated boss 76 on the limb 72, the shaft 60 being keyed to the bosses 74 and 76 so that the arm 34 moves pivotally about the axis of the shaft 60 on actuation of the cylinder 54. An upper stop block 78 is fixed on the arm 34 to co-operate with a stop block 80 (FIG. 3) fixed on the bracket 24, thus limiting the upward movement of the arm 34. There is a corresponding lower stop block 82 on the arm, and a block 84 on the bracket 24: these stops define the lower limit of movement of the arm 34. The arm 34 moves through 90° between its two positions.

In the track portion 68 there are two pins 94, seen in dash lines in FIG. 2, which are biased by a spring (not shown) to project into the track but which are yieldable to retract out of the track. Their purpose is to hold centrally in place a carriage located in the track portion 68 and prevent the carriage from accidentally moving out of the arm.

Figure 3:
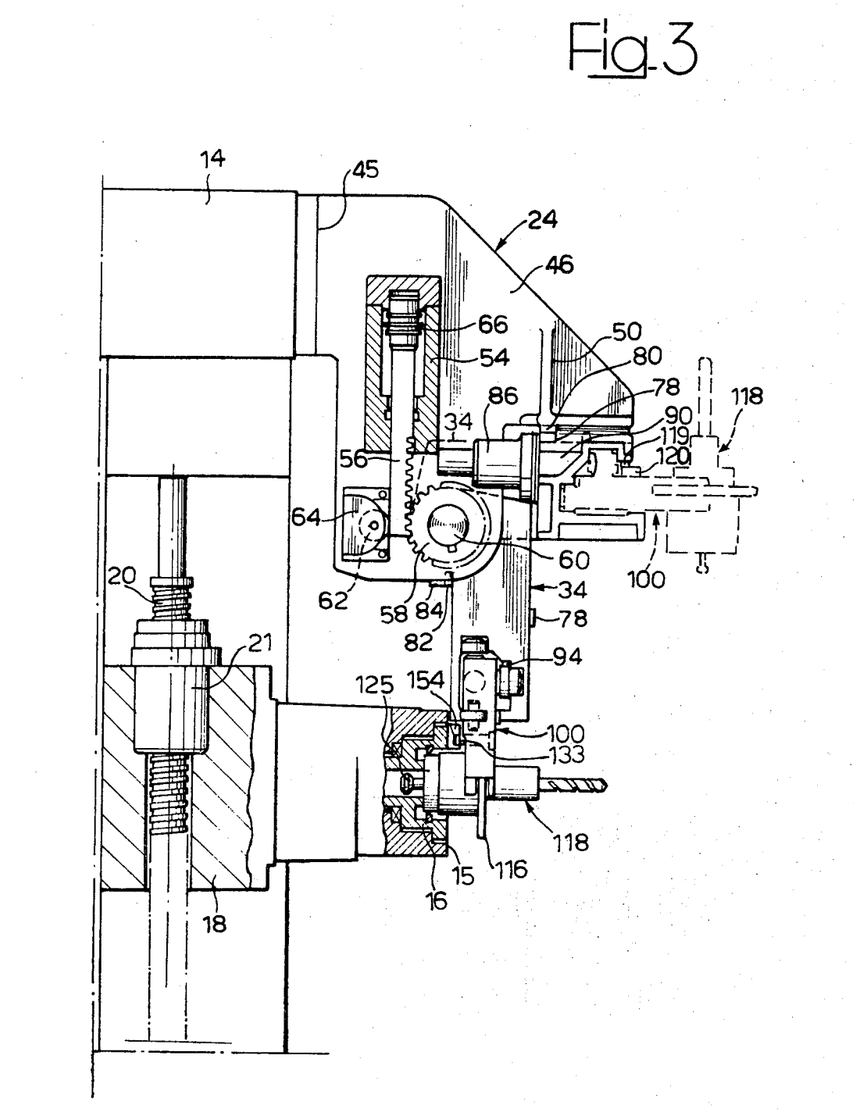
FIG. 3 is a side view, partly in section, of a part of the machine of FIGS. 1 and 2, showing the tool-change arrangement.

The arm 34 is seen in its lower position in FIG. 3, extending vertically, and is seen in dash lines in its upper position, in which it extends horizontally.

Figure 4:
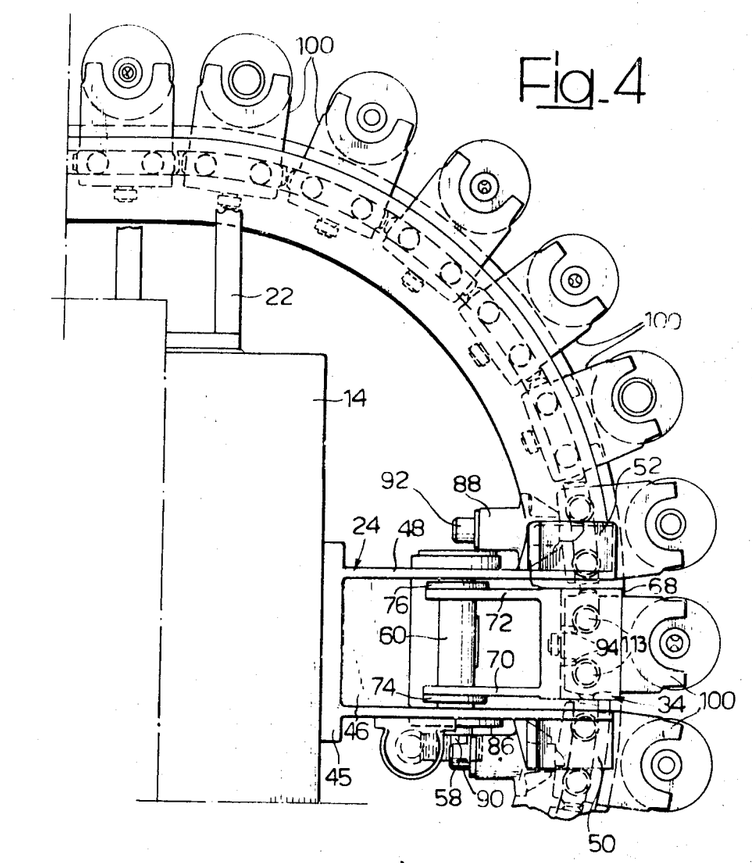
FIG. 4 is a plan view of a part of the machine of FIGS. 1 to 3 at the tool-change station.

As is best seen in FIG. 4, the bracket 24 carries a carriage arrest device 86 on the limb 46, this device comprising in essence a hydraulic cylinder of which the piston stem 90 forms an arrest member capable, when extended, of projecting through a hole (not seen) in the track 28 to abut against a roller 111 (FIG. 5) carried by a carriage 100 and prevent it from travelling further on the track 28. There is a similar carriage arrest device 88 on the other limb 48 engaging another roller 111, with an arrest member 92 that is shown extended in FIG. 4. In their retracted position the arrest members 90 and 92 naturally allow unimpeded movement of the carriages along the track. The two devices are biased by springs (not seen) to their extended positions.

Located end-to-end along the full length of the track 28 are a series or train of carriages 100 that are separate from but in contact with each other.

Figure 5:
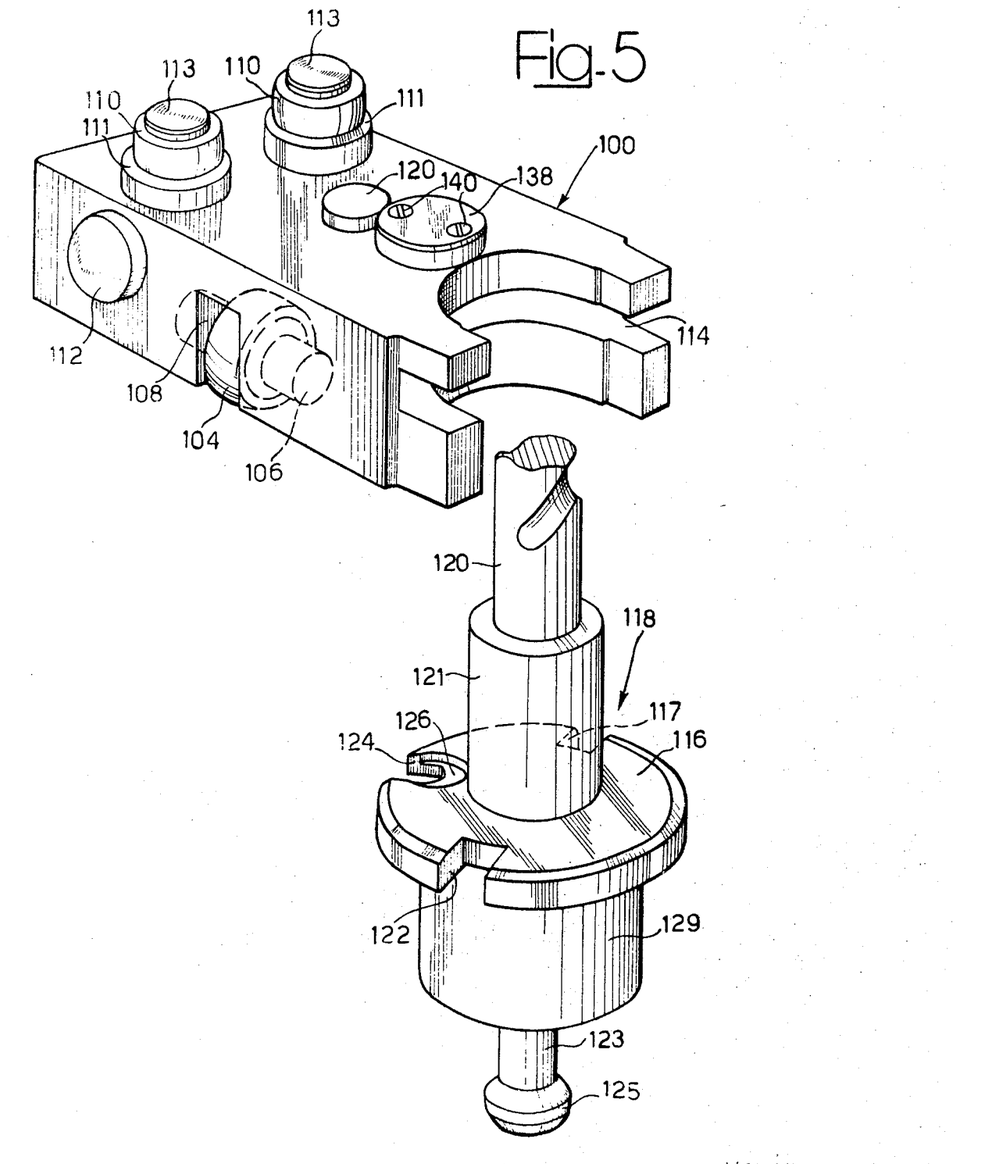
FIG. 5 is an exploded perspective view of a carriage and tool holder of the machine of FIGS. 1 to 4.
Figure 6:
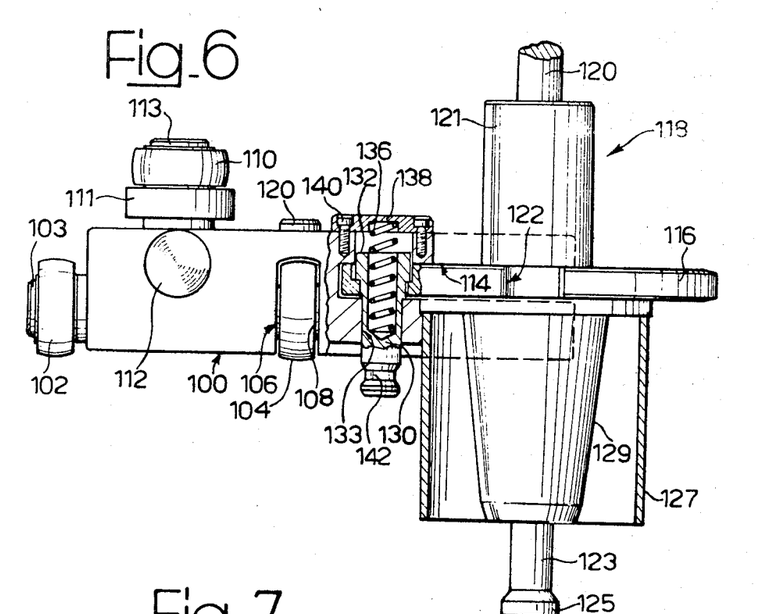
FIG. 6 is a side view, partly in section, of a tool holder supported by the carriage of FIG. 5.
Figure 7:
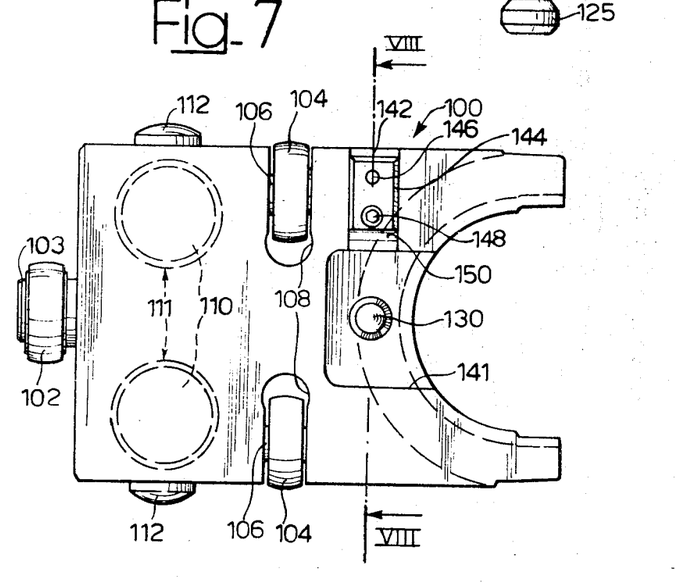
FIG. 7 is an underplan view of the carriage of FIGS. 5 and 6.

As is seen in FIGS. 5, 6 and 7, each carriage 100 has a body formed from plate and carrying a series of rollers that support it stably and allow it to slide with minimal friction on the track 28. The rollers comprise a single central roller 102 on a shaft 103 at the rear end of the carriage body, slidable on a seat 101 (FIG. 2) of the track 28. Two side rollers 104 project below the carriage body and are set on shafts 106 that extend transversely of the track 28 in slots 108 of the carriage body to bear on a seat 107 of the track 28. Two upper rollers 110 with vertical axes are supported on shafts 113 which also carry the rollers 111, that are rotatable independently of the rollers 110. The rollers 111 are slidable on another seat 113 of the track 28. In the arm 34, the rollers 111 are moreover lightly engaged by the pins 94 (FIGS. 2 and 4), to centre the carriage. The rollers 111 also have another purpose to be explained later.

By means of the seats 101, 107 and 113 which receive the rollers 102, 104 and 110, the track 28 holds the carriage stably against vertical and transverse forces. The carriage 100 also bears two outwardly projecting bosses 112 with radiused heads. They provide contact surfaces for one carriage to abut against another when the carriages 100 are driven along the track.

Figure 13:
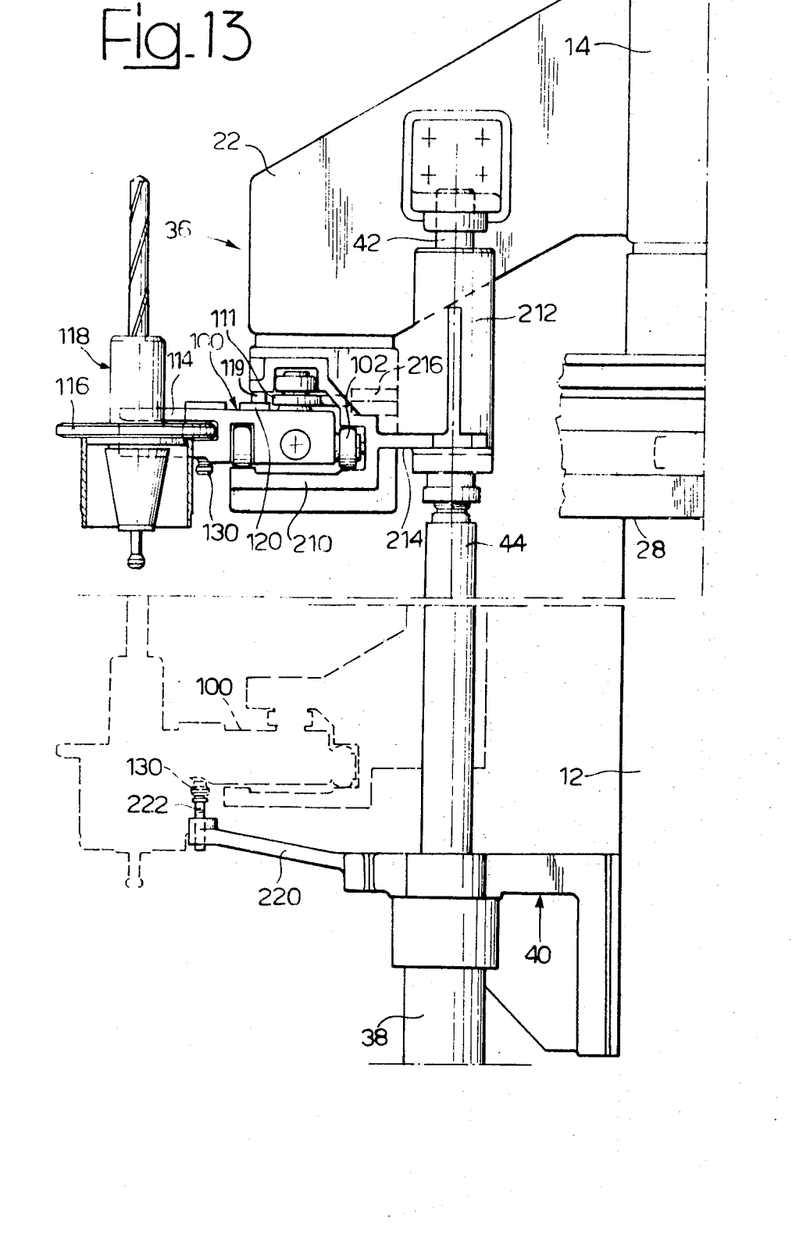
FIG. 13 is a side view of the arrangements at a tool substitution station of the machine of the preceding figures.

The top surface of each carriage 100 also bears a boss 120 (FIG. 5) of a height such as to be located at very slight clearance below a block 119 (FIGS. 3 and 13) located on the upper surface of the track portions 68 and 210, so preventing vertical movement of the carriage 100 during tool change and substitution and avoiding any tendency towards vibration or rattling.

The forward end of each carriage 100 (FIG. 5) is formed as a clevis and has a central longitudinal slot 114 extending some distance inward from it and, in the track 28, lying horizontally. The slot 114 receives a flange 116 of a tool holder 118 surrounding a tool 120, such as a drill or a milling cutter, set in a collar 121 that is fast with the flange 116. There is a total of about 2 mm. of clearance between the slot 114 and tool holder 118 when the tool holder is supported in the carriage 100.

As is seen in FIG. 5, the flange 116 of the tool holder 118 has three generally radial slots in its surface. Two are diametrically opposite each other and are indicated by the numerals 122 and 117. Their function is to receive keys (not illustrated) in the spindle 16 and so hold the flange fast with the spindle 16 during rotation. The third slot 124 is spaced midway between the slots 122, and has a shallow bulbous recess 126 at its radially inner end to form a rebate extending for more than 180°. Fast with the tool 120 and collar 121 is a pin 123 with a bulbous end 125 adapted to be gripped and rotated by known means, not illustrated, in the spindle 16. The lower part of the tool holder is covered by a protective annular shroud 129 of the type described in Italian Patent No. 859,971.

As is seen in FIG. 6, the tool holder 118 is held positively in the carriage 100 by a pin 130 with an enlarged head 132 that is movable in a bore 133 in the body of the carriage. The bore 133 intersects the slot 114. The bore 133 is of a diameter slightly greater than the head 132 in the part of the carriage seen in FIG. 6 above the slot 114, and is of a reduced diameter, smaller than the head 132, below the slot 114. The pin 130 is hollow in its upper part and carries a biasing spring 136 that bears at its upper end against a plate 138 secured to the body of the carriage 100 by screws 140.

The head 132 of the pin 130 is of slightly smaller diameter than the diameter of the recess 126 (FIG. 2) in the flange 116 of the tool holder 118. When the tool holder 118 is in place in the carriage 110, the head 132 therefore seats in the recess 126 and locks the tool holder in place. It can only be extricated by forcing the pin 130 back towards the plate 138 to free the head 132 from the recess 126, and moving the tool holder out of the slot 114.

Note that in FIG. 6 the end of the pin 130, in which a circumferential groove 142 is formed, projects some distance below the body of the carriage.

In FIG. 7 it will be seen that there is a recess 141 of generally rectangular shape in the body of the carriage 100 surrounding the end of the pin 130. Mounted in a slot 142 also in the undersurface of the carriage 100 is a block 144 secured in place on the carriage by a conical pin 146 (FIG. 8) and a screw 148. The block 144 has an obliquely sloping face 150 adjacent the recess 141. The block 144 is not seen in FIG. 6 because of the sectioning in that figure.

Mounted on the non-rotary bush 15 of the spindle 16 is a further block 154 (FIGS. 8 and 9) held in place by screws 156. The block 154 has a cavity 158 in its front face such as to leave a vertical wall 155 and a sloping wall 157, best seen in FIG. 9.

When the arm 34 is lowered fully and the spindle is in its upper position, the end of the pin 130 carried by the carriage 100 abuts against the vertical surface 155 of the block 154. Transverse to the cavity 158 is a bore 162 (FIG. 8) in which is slidable with a measure of friction a latch 164 having a shaped inner end adapted to engage in the groove 142 near the end of the pin 130. The latch is prevented from emerging fully from the block 154 by a plate 166 which abuts against a flange 168 on the latch 164 and is held on the block 154 by screws 176.

Figure 8:
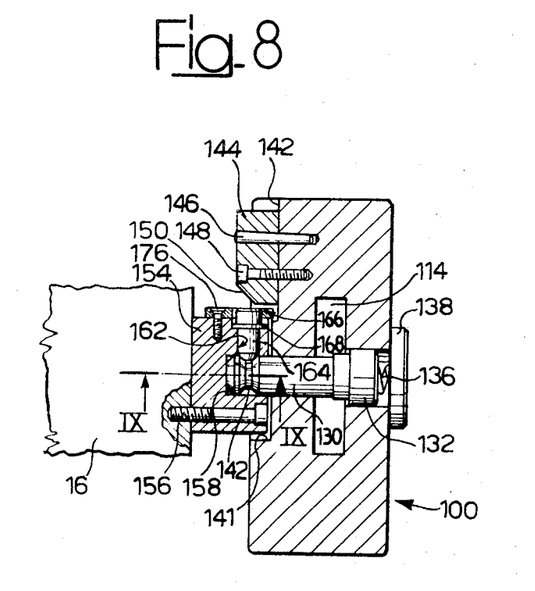
FIG. 8 is a scctional view along line VIII—VIII of FIG. 7 through a locking device on the carriage of FIGS. 5 to 7, shown engaged with the spindle head of the machine, certain details of the carriage being omitted.

As will be explained later, the outer end of the latch 164 is engaged by the sloping face 150 of the block 144 when the arm is lowered, and moves the latch 164 from its inoperative position to its operative position. FIG. 8 shows the latch in its operative position.

Figure 10:
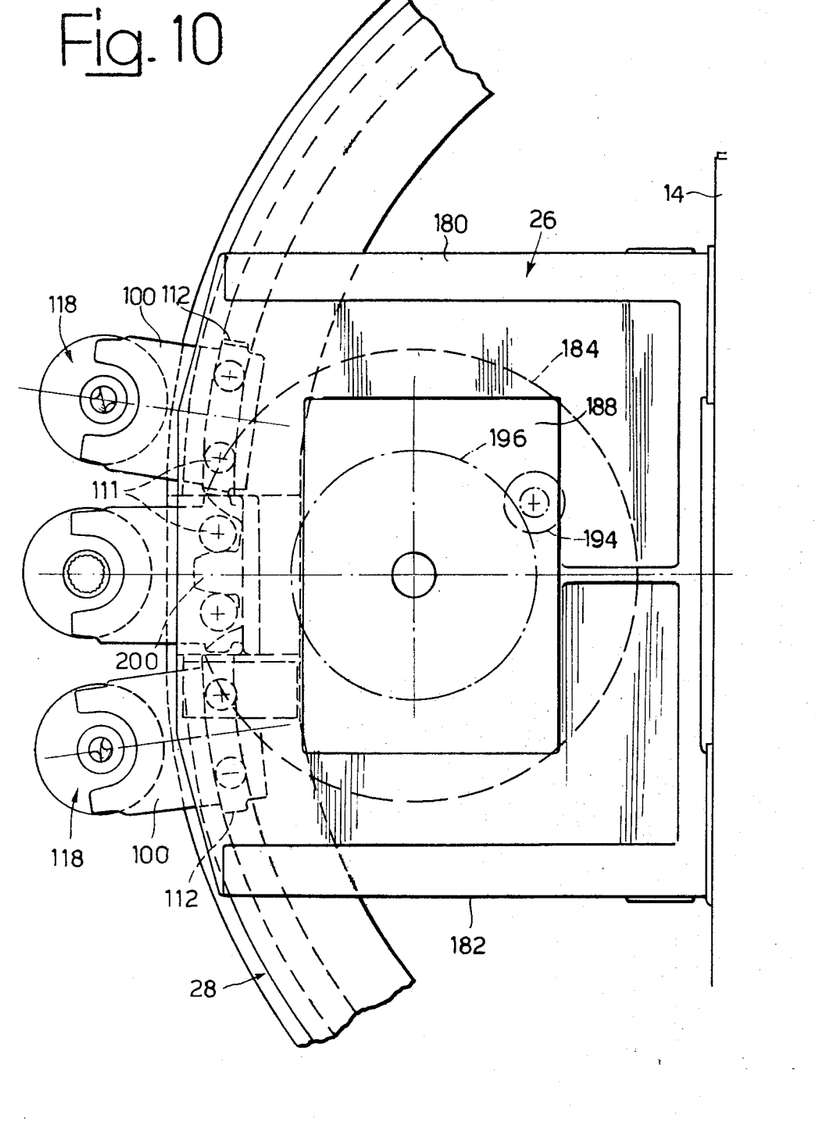
FIG. 10 is a plan view of a part of the machine of the preceding figures, showing schematically the arrangements at the end opposite that seen in FIG. 4 for driving the carriages.
Figure 11:
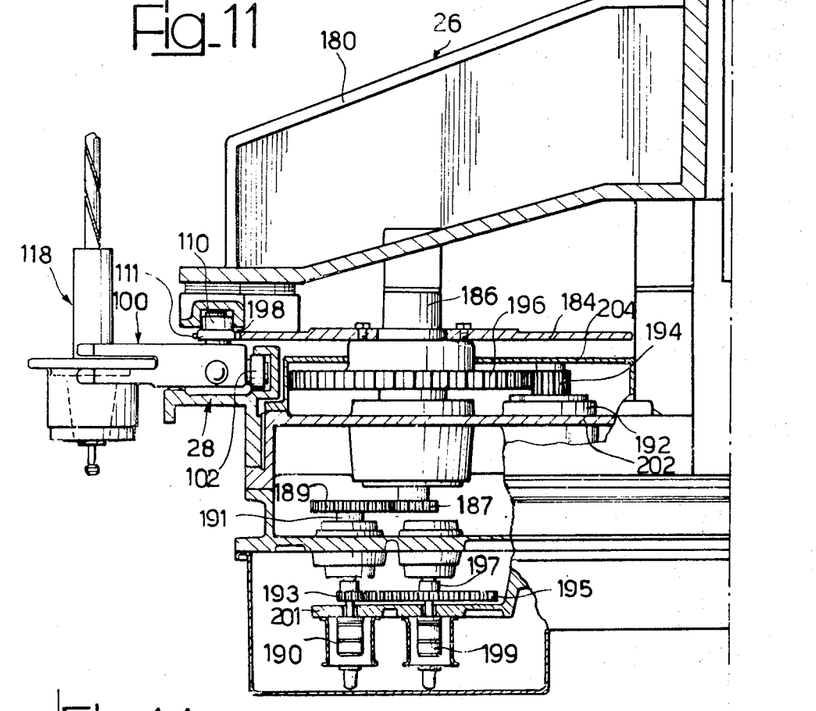
FIG. 11 is a side view partly sectioned, of the part of the machine seen in FIG. 10.
Figure 12:
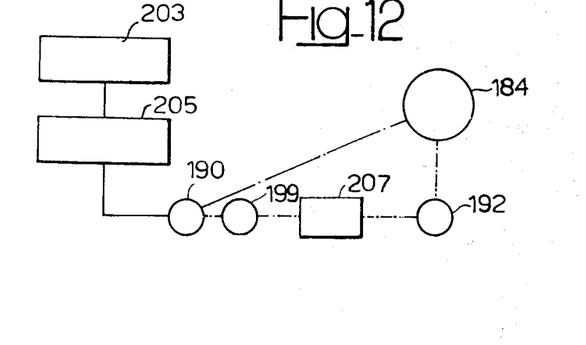
FIG. 12 is a block diagram showing the relationship between various components concerned with the identification and correct positioning of the various tools in the magazine of the machine of the preceding figures.

The arrangements for driving the carriages 100 around the track 28 are seen in FIGS. 10, 11 and 12. Between two limbs 180 and 182 of the brackets 26, and at the level of the rollers 111 on the upper surface of the carriages 100, is mounted a large toothed wheel 184 fixed on a shaft 186 that is set in a fixed structure 204. The shaft 186 extends downwardly and carries a gear 187. The gear 187 meshes with a gear 189 on the shaft 191 of a so-called resolver unit 190 of a type known in the art. The shaft 191 also carries a gear 193 which meshes in a 1:10 ratio with a gear 195 on the shaft 197 of another resolver unit 199. The resolver units 190, 199 and their shafts are supported by fixed structure 201. The wheel 184 is driven by a hydraulic motor 192 through a pinion 194 and a drive gear 196 mounted on the shaft 186. The track 28 is interrupted by a slot 198 in the vicinity of the toothed wheel 184 to allow teeth 200 of this wheel to engage between the rollers 111 of each carriage 100 and between the rollers 111 of adjacent carriages and so entrain the carriages around the track, one carriage contacting the other through the bosses 112.

Shown schematically in FIG. 12 is the computer 203 which controls the operation of the machine. It is connected to a numerical-analogical converter 205 of a known type which is connected to the resolver units 190, 199. These units 190, 199 are in turn connected to a servo mechanism 207 which controls the motor 192, this motor driving the wheel 184 which as explained above drives the carriage 100 around the track 28. The components 203, 205 and 207 are not illustrated in FIGS. 10 and 11.

When a signal for a particular tool to be brought to the tool-change station is issued by the computer 203, the signal passes to the converter 205 which converts the signal to analogical form and conveys it to the resolver units 190, 199. As is known in the art, each of these members comprises a stator and a rotor, and emits an error signal relatively to the signal received from the converter 205, the error signal corresponding to the angular position of the rotor relatively to the stator. The rotor of the unit 190 is connected to the shaft 191, and the rotor of the unit 199 to the shaft 197.

If the magazine of the machine is designed to carry 100 tools, the resolver unit 190 will be so connected to the shaft 186 that its rotor will rotate through 10 full revolutions for a complete passage of all the carriages 100 around the track 28. Because of the 1:10 ratio between the gears 193 and 195, the rotor of the resolver unit 199 will naturally rotate during this time through only one full revolution.

The rotors of the units 190 and 199 may be considered as comprising 10 sectors, the unit 199 corresponding to the 10s in the number (100) of carriages 100, and the unit 190 to the units. Each carriage 100 is identified with a sector of the rotors of each of the units 190, 199, so that the angular position of the rotors of the resolver units 190, 199 at any instant corresponds to a certain position of every carriage 100 on the track 28.

The error signal emitted by the resolver units 190, 199 is conveyed to the servo mechanism 207 which causes rotation of the motor 192 in a direction tending to reduce the error signal to zero, and thus driving the carriages 100 along the track 28 in a direction such that the next carriage 100 desired at the tool-change station follows the shorter of the two possible routes. When the error signal is reduced to zero, corresponding to the arrival of the required carriage in position, the servo mechanism 207 is inoperative and the motor 192 accordingly stops.

Two resolver units are to give the machine a high resolution power, corresponding to a high degree of accuracy in the positioning of the carriages 100 on the track 28. However, a single resolver unit might be used if it alone has a sufficiently high power of resolution. In any case the resolver unit or units used functions or function as a positional transducer adapted to indicate the position of the carriages 100 on the track 28.

TOOL SUBSTITUTION SYSTEM

The substitution device 36 includes, apart from the movable portion 210 of the track 28 (FIG. 1), the fixed pillar 38, which is a hydraulic cylinder having as its piston stem the vertical telescoping rod 44. Fixed to the top of the rod 44 is a body 212 (FIG. 13) which slides on the two fixed guide rods 42 and to which the track portion 210 is connected by means of a web 214. The track portion 210 carries two projecting spring-biased pins 216 similar to the pins 94 carried by the arm 34. The function of the pins 216 is to act as detents holding a carriage 100 properly centred and positively retained in the track portion 210, but being yieldable on rotation of the driving wheel 184 to permit the carriages to pass along the track 28.

The base plate 40 has a forwardly projecting finger 220 on which is mounted a vertically projecting stud 222. The base plate 40 is so located that an operator standing on the platform 42 (FIG. 1) finds the base plate 40 at approximately waist height. However, the height of the base 40 may be adjustable.

The operator actuates the substitution device by causing the hydraulic cylinder of the piston 38 to raise or lower the track portion 210 from or to the base plate 40, which acts as a tool substitution station spaced away from the storage magazine constituted by the track 28 and carriage 100. When the body 212 is in its lowest position on the base plate 40, the stud 222 raises the pin 130 of the carriage clear of the flange 116 of the tool holder 118, so freeing the tool holder to be removed from the carriage 110 by a simple sideways displacement. The tool substitution device also delivers the tool holder 118 to the substitution station in its most convenient orientation for manhandling, namely with the flange 116 horizontal and the tool pointing upwards. Stops (not illustrated) are provided to limit the travel of the body 212 at either end of its stroke.

CONTROLS

Not illustrated in the drawings but known in the art are suitable hydraulic and electrical circuits to actuate the machine. Details are likewise not given of the computer 203 which receives a progamme, conveniently in the form of a punched tape, to carry out a complete machining operation on a workpiece fixed on the table 10, such computers being also known in the art. The programme will invariably call for several tools to be used in sequence, each being automatically drawn from the magazine and replaced in it.

The track 28 is designed to accommodate a number of carriages 100 suitable for the type of work the machine will be required to perform. However, the magazine capacity can readily be increased by adding further track sections 30 and brackets 22, requiring only minor modifications to the basic structure of the machine. A limit on the number of tools used is also set by the construction of the resolver units 190, 199.

DETAILED OPERATION OF THE MACHINE

The magazine of the machine, comprising the track 28 and carriages 100, is first filled with the tools that are required for the operation in hand. For this purpose, each carriage 100 is in turn brought to the substitution station constituted by the base plate 40 where any prior tool not necessary to the operation in hand is removed and replaced by a necessary tool. To do this, the motor 192 (FIG. 11) is actuated to rotate the driving wheel 184 to bring the required carriage into the track section 210 of the substitution device 36. The yieldable pins 216 (FIG. 13) engage against the roller 111 and hold the carriage properly centred in the track section 210.

The body 212 carrying the carriage 100 is then lowered towards the base plate 40. When it arrives, the stud 222 on the finger 220 overcomes the spring 136 (FIG. 6) and raises the pin 130 to free its head 132 from the flange 116 of the tool holder 118. The tool holder can then be removed manually by taking it from the slot 144 in the carriage 100. A new tool holder 118 is inserted in the slot 114 and the head 212 is raised. The pin 130 engages in the flange 116 of the tool holder 118 as soon as the tool holder 118 is above the level of the stud 222, and the tool holder is therefore held positively in the carriage.

When the track section 210 is again aligned with the track 28, the motor 192 (FIG. 11) is actuated to move the train of carriages 100 forward by one position so that the next carriage 100 is located correctly for substitution of its tool. The detent pins 216 (FIG. 13) yield resiliently under the force of the driven train of carriages 100 to allow them to pass. The tools are arranged in the magazine in a fixed sequence which does not change during the machining operation.

While the magazine is being filled with tools the arm 34 (FIG. 4) is in its raised position and the carriage arrest members 86 and 88 are retracted. When the magazine is fully stocked with the required tools, a programme is fed to the computer and a blank workpiece on which the programme is to be executed is secured to the table 10 (FIG. 1).

A tool is then inserted in the spindle 16. For such insertion, the computer 203, acting through the components illustrated in FIG. 12, actuates the motor 192 to rotate the drive wheels 184 and so drive the train of carriages around the track 28. The direction in which the train of carriages moves is such that the required carriage traverses the shorter of the two possible routes to the arm 34. When the error signal emitted by the resolver units 190 and 199 reaches a zero value, the train of carriages 100 halts since the required carriage 100 is then in the track section 68 of the arm 34. The computer then causes the carriage arrest members 86 and 88 (FIG. 4) to extend their arrest members 90 and 92. The arrest member corresponding to the direction of movement of the carriages 100 then engages one of the rollers 111 of the carriage following that chosen, which has reached the portion 68 of the track 28. The motor 192 then reverses direction and the train of carriages is returned a short distance until it is positively stopped by the engagement of the other arrest member 90 or 92 against a roller 111 of the carriage 100 adjacent the carriage in the track section 68.

In this position the carriage 100 in the track section 68, i.e. the carriage at the tool-change station, is positively centred and is retained by the yieldable pins 94.

The saddle 18 is meanwhile raised to bring the spindle 16 into its upper or tool-change position.

The arm 34 is then lowered by actuation of the cylinder 54 (FIG. 3), causing the rack 56 to rotate the pinion 58 through 90° to bring the tool from the tool-change station associated with the magazine to the spindle 16. The pivotal movement of the arm 34 is halted at the end of its travel by the engagement of the stop member 82 carried by it on the stop member 84 carried by the bracket 24, the movement being dampened towards the end of the stroke by the dampening means incorporated in the cylinder 54. Excessive forces on the rack 56 are prevented by its support from the roller 62.

As the tool swings into the spindle 16, the bulbous end 125 at the end of the shaft 123 is gripped in the spindle by means known in the art and not illustrated, and at the same time keys not illustrated enter the slots 122 and 127 (FIG. 5) to cause rotation of the tool holder and the tool 120 it carries.

Figure 9:
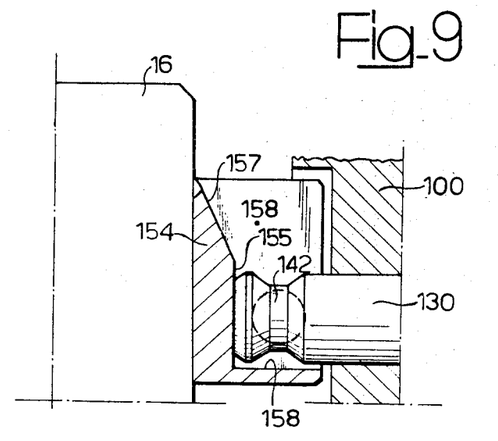
FIG. 9 is a sectional view on an enlarged scale on the line IX—IX of FIG. 8.

While the arm 34 (FIG. 3) is moving from its first or raised position to its second or lowered position, the tool holder 118 is of course held positively in the carriage 100 by the pin 130 as seen in FIG. 6. However, on reaching its lowered position, the projecting end of the pin 130 enters the cavity 158 in the block 154 and the conditions seen in FIGS. 8 and 9 are attained. In the last part of the stroke the pin 130 is arrested by the block 154 (FIG. 8) and moves relatively to the carriage against its spring 136 so that its head 132 is freed from the recess 126 in the flange 116 of the tool holder.

As the arm 34 approaches the end of its downward stroke and after the pin 130 has contacted the block 154, the sloping face 150 of the block 144 contacts the latch 164 and moves it inward to engage in the annular groove 142 on the pin 130. There is then a further very slight movement of the arm 34, with the latch 164 engaged, before the arm reaches the end of its stroke.

With the arm 34 lowered in its second position, the tool holder is freed from the carriage 100 and is gripped by the spindle 16. The spindle 16 is then lowered from its upper tool-change position by lowering of the saddle 18 to remove the flange 116 fully from the slot 114 in the carriage 100. Lowering is continued until the spindle reaches its working position. During such lowering the pin 130 moves over the surface 155 and 157 of the block 154 emerging at the open top end of the block 154 and moving the head 132 back into a position in the slot 114 where it prevents entry of the flange 116. The tool 120 is then rotated in the spindle and the required operation is carried out on the workpiece. The arm 34 remains lowered while this operation is carried out.

When it has been completed and a fresh tool is required in the spindle, the spindle 16 is angularly oriented as described before and is raised to its tool-change position and its grip on the enlarged end 125 of the tool holder 118 is released. As the spindle 16 rises, the pin 130 rides over the surfaces 157 and 155 (FIG. 9) of the block 154 on the spindle, forcing the pin 130 backwards to a position in the carriage 100 in which the head 132 is clear of the slot 114. The flange 116 of the tool holder 118 re-enters the slot 114 and the pin 130 (FIG. 6) re-enters the slot 124 in the tool holder flange 116. The computer causes the arm 34 to be raised towards its first position. In the initial rising movement of the arm 34, the pin 130 (FIG. 8) remains locked by the latch 164 in the block 154. The action of the spring 136 causes the head 132 of the pin 130 to re-enter the recess 126 in the flange 116, and so the hold of the carriage 100 on the tool holder 118 is resumed very early in the upward stroke of the arm 34 while the tool holder 118 is still supported in the spindle 16 but not gripped by it.

With a slight further movement of the arm, the sloping face 150 of the block 144 again passes over the outer end of the latch 164. The outward pull on the pin 130 exerted by the carriage causes the pin 130 to force the latch 164 outward, the latch eventually clearing the groove 142 in the pin 130 and allowing the pin 130 to move freely out of the cavity 158 in the block 154. By then the pin 130 has resumed the same position, relatively to the tool holder flange 116, as is shown in FIG. 6.

When the arm 34 regains its raised position the stop 78 abuts on the stop 80 and so halts the arm positively with the track section 68 properly aligned with the fixed track 28. The carriage arrest members 90 and 92 are retracted, and the train of carriages 100 is then driven the necessary distance around the track 28 to bring the next tool required into the tool-change station between the limbs 46 and 48 of the bracket 24.

Various microswitches, not illustrated, are actuated by certain moving components to provide the necessary signals for the computer to act upon in carrying out its programme. The general nature of such a system of switches is known in the art.

THE EMBODIMENT OF FIG. 14

Figure 14:
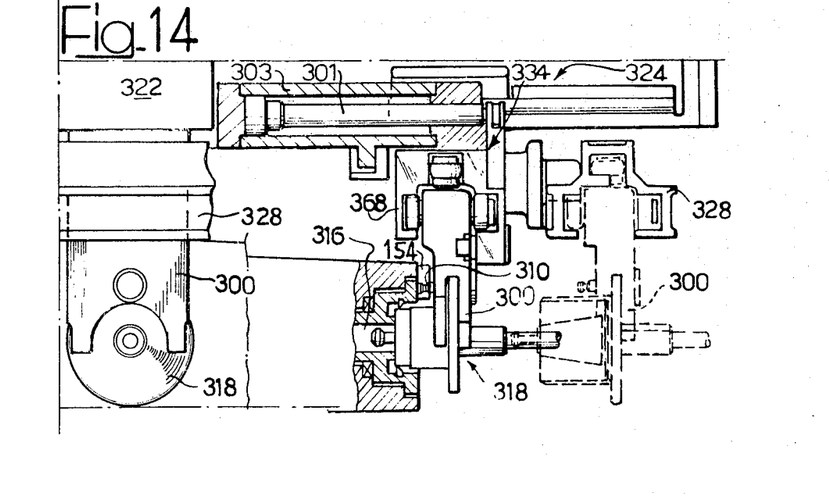
FIG. 14 is a side elevation view of the front portion of a modified machine tool, part of its track being broken away for the sake of clarity and certain components being sectioned.

FIG. 14 shows an embodiment of the invention which is generally similar to that of the preceding figures but in which the tool-change member is not a pivoted arm but a slide 334 that moves in a rectilinear path, carrying a track section 368. The slide 334 is connected to the stem 301 of a hydraulic cylinder 303 that is mounted on an overhead bracket 324 at the front end of the machine.

A track 328 is supported by the bracket 324 and other brackets 322 projecting from a cap (not illustrated) at the top of the machine. The track holds a series of carriages 300 which are similar to those described in relation to the preceding figures. The carriages 300 are in this case held in the track vertically; that is, with the flanges of the tool holders 318 hanging vertically. A pin 310 on each carriage 300 holds the tool holder 318 in place, the pin being dislodged by a block 354 to release the tool holder when the slide 334 reaches a spindle 316.

When the cylinder 303 is extended, the stem 301 holds the slide 334 in a first position in which it is aligned with the track 328, which is then continuous and along which the carriages 300 may be driven in the same fashion as described earlier in relation to the preceding figures.

During working, the slide 334 is located backwards by the action of the cylinder 303 which holds it in the position shown in FIG. 14. When the tool must be changed, spindle 316 is raised together with a saddle (not illustrated), carrying it to an upper tool-change position shown in FIG. 14. The slide 334 is then moved forward to bring the track section 368 into alignment with the fixed track 328 at a magazine tool-change station defined in a gap between two portions of the fixed track 328. The track 368, by means of the carriage 300, thus disengages from the spindle 316 the tool holder 318 which has already been used.

The train of carriages 300 is then driven around the track 328 until the required next tool is in the tool-change station, and the slide 334 is then retracted to place the new tool in the spindle 316. The spindle 316 is then lowered to its working position. Details such as controls, stops, and hydraulic and electrical circuits for the machine are not illustrated, being in general similar or analogous to those of the machine of FIGS. 1 to 13.

It will be noted in both the embodiments described above that the track length can easily be extended to accommodate an increased number of carriages, and hence increase the storage capacity of the machine. The lengths of the tools carried by the tool holders may also be very great, not being limited by any structural requirements of the machine itself.

Because of the simple path followed by the tool-change member, the mechanism for moving the arm is also very simple, and hence easy to construct and maintain.

We claim:

1. In a machine tool with automatic tool-change, the machine tool comprising a spindle, a tool storage magazine, and a tool-change member adapted to move a tool between the magazine and the spindle, the improvement wherein the magazine comprises an endless track, a plurality of carriages slidable along the track, each carriage being adapted to releasably carry a tool, means for driving said carriages along the track, said tool-change member including a movable portion of said track adapted to support one of said carriages, said portion being rotatably mounted on a shaft supported on said machine tool and having an axis perpendicular to the axis of said spindle, and moving means for moving said portion on said shaft in an arcuate path between a first position in said magazine and a second, tool-changing position for said spindle.

2. The machine tool of claim 1, in which the tool-change member further comprises an arm carrying said track portion and rotatably mounted on said shaft to move the movable portion of the track in said arcuate path.

3. The machine tool of claim 1 including a column having a cap, the spindle being mounted on a saddle which is movable on said column between a lower working position and a raised tool-change position of the spindle, the track lying in a horizontal plane above said spindle, the track surrounding said cap located on the column and secured to the cap by brackets projecting outwardly from the cap.

4. The machine tool of claim 1, in which the plurality of carriages are located end-to-end along the track, each of said carriages having at least one formation projecting therefrom, the driving means for the carriages comprising a toothed wheel mounted adjacent said track, the teeth of said wheel projecting outwardly to engage said formations projecting from the carriages.

5. The machine tool of claim 4, in which each of said carriages include at each end a boss having a radiused surface, the carriages being located end-to-end along said track so that the end boss of each carriage contacts a similar boss on the next adjacent carriage for transmission of the drive provided by said driving means from one carriage to the next.

6. The machine tool of claim 1, in which the tool carried by each of said carriages is gripped in a tool holder that is held positively but releasably in each carriage by holding means comprising a pin movably housed in the carriage and engaging a portion of said tool holder for locking the tool holder in the carriage, and including a block fixed to a column in which the spindle is movable, the block being located adjacent said second position of the movable portion of said track and contacting said pin to displace said pin sufficiently to release the tool holder for removal from the carriage.

7. The machine tool of claim 8, in which each of said carriages includes a slot, the engaged portion of said tool holder comprising a flange adapted to extend into said slot, the pin being mounted on the carriage to intersect the slot and having a head of enlarged diameter, the pin being biased by a spring to a position in which the head is located in the slot and cooperates with a portion of said flange to lock said tool holder in said carriage, the pin cooperating with said block to overcome said spring bias and take up a position in which the head is located outside the slot unlocking the tool holder from the carriage.

8. The machine tool of claim 7, in which the flange of the tool holder has a radial slot adapted to receive the pin when the tool holder is located in the slot in the carriage, and a recess located along the length of the radial slot to receive the head of the pin when the head is located in the slot in the carriage, such engagement of the head in the recess holding the tool holder positively in the carriage.

9. The machine tool of claim 8, including means to hold the pin stationary with the head of the pin located outside the slot in the carriage, said holding means being operative during substantially all of the period of engagement between said block and said pin in which the movable portion of the track is in its second position and the spindle is in a tool-chage position.

10. The machine tool of claim 9, in which the means to hold the pin comprises a latch mounted on the block, such latch being moved into locking position by a member carried on and protruding from said carriage in spaced relationship with said pin when the movable portion of the track approaches its second position, and being released after the movable portion has returned partly from its second towards its first position.

11. The machine tool of claim 10, wherein the projecting member includes a sloping face located relative to said pin and being moved relative to said latch to contact the latch and move it into a locking position when the movable portion of the track approaches its second position, and being moved clear of the latch to release the latch when the movable portion has returned partly from its second towards its first position.

12. The machine tool of claim 1, including at least one carriage arrest member located at the track along said the movable portion of the track and adapted to be actuated to immobilise one of said carriages adjacent a carriage on that movable portion.

13. The machine tool of claim 12, in which the carriage arrest member comprises a hydraulic cylinder having a movable stem that projects toward the track to selectively engage a formation on the carriage immobilized.

14. The machine tool of claim 1, including a yieldable retaining member on the movable portion of the track yieldably contacting a formation on each of said carriages as it is located on said movable track portion, said retaining member being yieldable on movement of said carriages by said driving means and being adapted to retain said one carriage in that movable portion when the movable portion moves between said first position and said second position.

15. The machine tool of claim 1, in which the carriages are provided with independently rotatable rollers to slid along the track, some of said rollers having axes located at right angles to the axes of other of said rollers.

16. The machine tool of claim 4, in which said formations projecting from each carriage comprise a pair of rollers with parallel axes mounted on a common surface of said carriage and adapted to be engaged by the toothed wheel.

17. The machine tool of claim 4, in which the toothed wheel is connected to a positional transducer to indicate to a control circuit the position of the carriages.

18. The machine tool of claim 1, including a tool substitution station spaced away from the magazine, and automatic means to move one of said carriages and the tool holder associated therewith between the magazine and the tool substitution station.

19. The machine tool of claim 18, in which the carriage moving means comprises a section of said tool-carrying track movable between a first position in which said portion is aligned with the track and a second position at the tool substitution station, and means to move said track section between said first and second positions.

20. The machine tool of claim 19, in which the tool substitution station is located vertically below the track and in which the means to move the track section comprises at least one vertical guide extending between the tool substitution station and the track and a hydraulic cylinder having a piston stem connected to the movable track section and movable parallel to the guide to displace the track section between said track and said substitution station.

21. In a machine tool with a storage magazine for tools, a spindle adapted to receive a took, and automatic tool-change means for inserting a tool from the magazine into the spindle for use and replacing it in the magazine after use, the improvement comprising a tool substitution station located vertically below the magazine and automatic means to move a tool between the magazine and the tool substitution station comprising a body adapted to support the tool in the magazine, at least one guide extending between the magazine and the tool substitution station, and means to move said body along the guide comprising a hydraulic cylinder having a stem to which the body is connected.

22. The machine tool of claim 21, in which the magazine comprises an endless track each tool being releasably held in a carriage that is slidable along the track, the body comprising a section of the track that accommodates a carriage.

23. In a machine tool with a storage magazine for tools, a spindle adapted to receive a tool, and automatic tool-change means for inserting a tool from the magazine into the spindle for use and replacing it in the magazine after use, the improvement wherein the magazine comprises an endless track each tool being releasably held in a carriage that is slidable along the track, and comprising a tool substitution station located below the magazine and automatic means to move a tool between the magazine and the tool substitution station comprising a movable portion of said track accommodating said carriage, at least one guide extending between the movable track portion of said magazine and the tool substitution station, and means to move said track portion along the guide between the magazine and the substitution station.

24. The machine tool of claim 23, in which the tool is secured in a tool holder, and including holding means releasably holding the tool holder in the carriage, and including a member located at the tool substitution station and adapted, on arrival of the track section at the tool substitution station, to release the holding means automatically, so freeing the tool holder for removal from the carriage.

25. The machine tool of claim 27, in which the tool holder has a flange located in a slot in the carriage, said flange having a radial slot with a recess along the length of said slot, the carriage including a pin movable in the carriage and having a head seated in said recess under the action of a biasing spring to hold the tool holder in the carriage, the tool substitution station including a stud adapted to engage the pin and move the pin to a position in which its head is clear of the recess thereby freeing the tool for removal from the tool holder.

26. In a machine tool with automatic tool change, the machine tool comprising a spindle, a tool storage magazine, and a tool change member adapted to move a tool between the magazine and the spindle, the improvement wherein the magazine comprises an endless track suspended on said machine tool, a plurality of carriages slidable along said track, each carriage being adapted to releasably carry a tool, means for driving said carriages along said track, said tool change member including a movable portion of said track adjacent said spindle adapted to support one of said carriages, a slide for carrying said movable track portion in a rectilinear path from a position of registry with said magazine track to a tool change position adjacent said spindle to engage a tool in said spindle, and drive means mounted on said machine tool relative to said track and said slide for moving said slide forward and backward relative to said track along an axis parallel to said spindle.

27. The machine tool of claim 26 wherein said drive means comprise a hydraulic cylinder having a stem parallel to said cylinder and carrying said slide.

28. The machine tool of claim 20 wherein the tool holder has a flange located in a slot in the carriage, said flange having a radial slot with a recess along the length of said slot, the carriage including a pin movable in the carriage and having a head seated in said recess under the action of a biasing spring to hold the tool holder in the carriage, the tool substitution station including a stud adapted to engage the pin and move the pin to a position in which its head is clear of the recess thereby freeing the tool for removal from the tool holder.

* * * * *

UNITED STATES PATENT OFFICE
CERTIFICATE OF CORRECTION

Patent No. 3,818,580  Dated June 25, 1974

Inventor(s) Elio Pagella, Giorgio Ollearo

It is certified that error appears in the above-identified patent and that said Letters Patent are hereby corrected as shown below:

Claim 7, line 1 alter "8" to --6--.

Claim 21, line 2 alter "took" to --tool--.

Claim 25, line 1 alter "27" to --24--.

Signed and sealed this 3rd day of December 1974.

(SEAL)
Attest:

McCOY M. GIBSON JR.
Attesting Officer

C. MARSHALL DANN
Commissioner of Patents